United States Patent [19]

Canzani

[11] Patent Number: 4,936,915

[45] Date of Patent: Jun. 26, 1990

[54] POROUS INERT ROAD GRIT

[76] Inventor: Alberto Canzani, 52 Via V. Veneto, Milan, Italy, 20124

[21] Appl. No.: 223,220

[22] Filed: Jul. 22, 1988

[30] Foreign Application Priority Data

Jul. 30, 1987 [IT] Italy ................. 21525 A/87

[51] Int. Cl.$^5$ ........................ C09K 9/12; C09K 3/14
[52] U.S. Cl. ................................ 106/13; 106/36; 106/487
[58] Field of Search ............... 428/340; 106/13, 36, 106/484, 405, 487; 404/20

[56] References Cited

U.S. PATENT DOCUMENTS

| | | | |
|---|---|---|---|
| Re. 32,609 | 2/1988 | Gancy | 106/13 |
| 2,410,910 | 11/1946 | Wait | 106/36 |
| 4,108,669 | 8/1978 | Otrhalek et al. | 106/36 |
| 4,243,415 | 1/1981 | Lowe, Jr. | 106/13 |
| 4,296,207 | 10/1981 | Siegmund | 106/13 |

FOREIGN PATENT DOCUMENTS

| | | | |
|---|---|---|---|
| 0210972 | 2/1987 | European Pat. Off. | |
| 0221269 | 5/1987 | European Pat. Off. | 106/36 |
| 49-11308 | 5/1974 | Japan | 106/36 |
| PCT/HU85/-00071 | 6/1987 | PCT Int'l Appl. | |
| PCT/US88/-00097 | 7/1988 | PCT Int'l Appl. | |
| 834168 | 5/1960 | United Kingdom | 106/36 |

*Primary Examiner*—Theodore Morris
*Attorney, Agent, or Firm*—Lerner, David, Littenberg, Krumholz & Mentlik

[57] ABSTRACT

The composition according to the invention is based on the use of an inert porous material which can be natural, artificial or synthetic, granular in form, and weighing less than 1 kg/dm3 in bulk. The porous granules, e.g. of expanded clay or similar, are partially saturated to the extent of 20-30% of their weight, with active ingredients which lower the freezing point of water. The melting additives can be added in the pure state or diluted in water, and there is provision for the addition of anti-acid limiters in amounts of about 0.2% by weight of the melting additive. The advantages of the composition with respect to sand are the greater manageability and ease with which it can be spread on icy or snow-bound surfaces; the low specific weight which reduces the tendency to settle in road drains and sewers, and, compared to salt, the almost non-existent corrosive action on the ironwork found in both vehicles and streets. Ecologically, the composition does not damage the natural vegatative environment. The optimum results thus obtained are attributed to the synergetic effect of the inert material (activated grit) and the melting additive incorporated in it.

16 Claims, No Drawings

POROUS INERT ROAD GRIT

BACKGROUND OF THE INVENTION

1. Field of the Invention

The present invention concerns a light composition, grit activator, particularly for icy or snow-bound surfaces, with de-icing properties.

2. Description of the Prior Art

At present in winter or in snow or icy conditions, de-icing materials e.g. sodium chloride or calcium chloride, are spread to lower the freezing point of water, and/or sand is spread to increase the coefficient of friction to a less dangerous level for people and vehicles.

It is known that such salts, injurious to vegetation, have the disadvantage of speeding up the corrosion of the mechanical parts of vehicles, as well as the iron fixtures in the pavement, such as manhole covers, watercourse liners, etc., to such an extent that their use today has been limited or completely forbidden.

Sand, on the other hand, because of its high specific weight, tends to accumulate in the pipes of street drains necessitating expensive clearing operations and, when it gets into the sewers, obstructs the normal water flow. Further, because of its weight, sand is a difficult material to transport and handle, especially in the private sector, and can only be spread with reasonable uniformity by mechanized means.

SUMMARY OF THE INVENTION

An object of the present invention is to produce a light composition, easily transported and spread, even manually by individual people on, for example, foothpaths where mechanized vehicles cannot go, which simultaneously has both gritting and de-icing features.

According to the invention it is has been surprisingly ascertained that spreading a porous inert material, preferably reduced to granular size and at least partially soaked with a melting additive, or an icy surface causes an immediate increase in the coefficient of friction even better than that achieved by spreading sand and/or salt, separately or together, on the surface to be treated.

The characteristics of lightness and manageability, added to the speed and efficiency of action of this composition, have the following advantages:

increasing the grip in an area almost three times the size of that covered by an equal weight of simple sand or sand/salt mix;

ease of manual spreading since, even when partially soaked with melting additives, the composition does not show any tendency to agglomerate;

actual impossibility of accumulating in drains since the specific weight of the composition, even when saturated with water, remains close to unity and the composition is easily washed through the sewers by the water from the melted ice;

almost non-existent damage to the metal parts of vehicles and street ironwork;

the possibility, according to one embodiment of the invention, of further reducing the attack on ferrous parts by the addition of a small quantity of anti-acid limiter to the melting additives;

the simple soaking of the melting additives in the desired proportions by very simple dispensing devices;

particular utility in private use e.g. on doorsteps and entries to houses, on pavements, and in areas around schools, public offices and social centers at least as an initial and immediate precaution;

ability to be packed in easily transported sacks, with results equal to those of three times the same weight of sand.

The materials and their proportions preferably used in the activated grit composition will now be described:

The base of the activated grit should be an artificial, natural or synthetic porous material with a weight per volume (or apparent weight in bulk) of less than 1 kg/dm$^3$, preferably in the range 0.5–0.8 kg/dm$^3$. Such material should be reduced to a granular size, depending on the requirements and the use, within a variable range of grain sizes to an illustrative but not limiting maximum size of 6 mm diameter.

A grain size range similar to crushed sand for construction with the following size distribution gave very satisfactory results:

| |
|---|
| about 2% between 4 and 2 mm |
| about 60% between 2 and 0.5 mm |
| about 20% between 0.5 and 0.2 mm |
| about 10% between 0.2 and 0.1 mm | the remainder being similar to dust.

Examples of light, porous, inert materials which could be used are: expanded clay; pumice; volcanic rock; porous concrete (known commercially as "gasbeton"); tufo; vermiculite; lapilli; borax; polystyrene; cork and materials similar thereto.

In particular, expanded clay tested in the Laboratorio Stradale dell'Istituto Vie e Trasporti del Politecnico di Milano (Road Laboratory of the Roads and Transport Institute of Milan Polytecnic) under conditions which will be described below, gave the following physical results, in a grain size distribution similar to crushed sand as described above:

| EXPANDED CLAY | kg/dm3 |
|---|---|
| Apparent bulk weight in natural humidity of 24% | 0.60 |
| As above but soaked with melting additive at 24% of the dry weight | 0.75 |
| As above but saturated with water | 1.15 |

In these trials the melting additives were:

alcohols; calcium acetate; magnesium acetate; calcium/magnesium acetate; calcium chloride; sodium chloride; magnesium chloride; glycerine; glycol or polyglycol; and natural and synthetic anionic, cationic and non-ionic surface tension agents.

These melting additives could be used either in pure form or in solution.

Preferably pure melting additives or melting additives dissolved in water are added in amounts of from about 15–25% of the weight of the base material. The proportion of melting additive to water in turn can vary from 5 to 50% (preferably from 10 to 30%.

Anti-acid limiters can be selected from a wide range including: amines and their salts; polyamines and their salts; oxyethylated amines; quaternary salts of ammonia; and amphoterics, added in an illustrative proportion of two per thousand of the weight of the melting additive. The Skid-test conducted by the Road Laboratory of the Milan Polytecnic on a patch of ice with a surface temperature of −10° C. (ambient temperature +30° C.) gave the following results:

| | |
|---|---|
| pure ice | 20 |
| ice spread with sand | 30-40 |
| ice spread with the composition using expanded clay and melting additives | 50-60 |

The variation in the range of values obtained from the device used to measure the radial friction is obviously influenced by the high ambient temperature.

The trials carried out with the materials described above, wherein a base of expanded clay having a grain size distribution similar to that of crushed sand was used in conjunction with different types of melting additives, produced results ranging between the given value limits. This indicates at least that the use of a melting additive different than salt does not prejudice the results, and has the additional advantage of not having the corrosive action of salt.

The data of some of the trials carried out are herein reported:

90% and 80% of the dry inert with 10% and 20% respectively of sodium chloride in solution;

12% water and 12% ethylene glycol in 100 parts by weight of dry expanded clay;

24% ethylene glycol in 100 parts by weight of dry expanded clay as above.

The only difference obtained was in the freezing point of water which was −1° C. and −9° C. respectively for the 20% sodium chloride and 24% ethylene glycol. The explanation of the unexpected efficiency in increasing the road surface friction by using the composition according to the invention, resides most probably in the creation of a synergistic effect as the melting additive, soaked into each individual grain, causes local melting, thereby fixing the same grains on the frozen surface.

The action of the composition is even more sensitive and useful on the dangerous, icy, mirror-like "verglas" surfaces.

Without leaving the area of protection of the present invention it remains understood that the composition described can be used in conjunction with a variable quantity of up to 20% by weight of a heavy inert material such as sand, gravel, or other heavy fillers.

The soaking of the inert porous material can be easily achieved either in a mixing drum or by means of a measured spray of melting additive, prepared according to the proportions provided for the solution in water, directly on a conveyor belt fitted with mixing combs or through a hopper.

I claim:

1. A friction activating composition for icy surfaces comprising, granular porous expanded clay having a bulk weight of less than 1 kg/dm$^3$, and a melting additive at least partially soaked into said porous expanded clay, said melting additive being releasable from said expanded clay to locally melt "melt said icy surface and upon refreezing of said melted surface to cause said porous expanded clay to become embedded in said icy surface".

2. A composition according to claim 1, wherein said expanded clay has a bulk weight between about 0.3 kg/dm$^3$ and about 1.0 kg/dm$^3$.

3. A composition according to claim 2, wherein said expanded clay has a bulk weight between about 0.5 kg/dm$^3$ and about 0.8 kg/dm$^3$.

4. A composition according to claim 3 wherein said expanded clay soaked with said melting additive has a bulk weight of between about 0.4 kg/dm$^3$ and about 1.0 kg/dm$^3$.

5. A composition according to claim 1 wherein said melting additive is chosen from the group consisting of alcohols, calcium acetate, magnesium acetate, calcium/magnesium acetate, calcium chloride, sodium chloride, magnesium chloride, glycerin, glycols, polyglycols, and surface tension agents.

6. A composition according to claim 1 further comprising an anti-acid limiter to reduce attack on ferrous structures.

7. A composition according to claim 6 wherein said anti-acid limiter is chosen from the group consisting of amines and their salts, polyamines and their salts, oxyethylated amines, quaternary salts of ammonia, and amphoterics.

8. A composition according to claim 1 wherein said melting additive is added in amounts of between about 5 wt. % and about 50 wt. % of said expanded clay.

9. A composition according to claim 8 wherein said melting additive is added in amounts of between about 15 wt. % and about 25 wt. % of said expanded clay.

10. A composition according to claim 1 wherein said melting additive comprises a melting agent dissolved in water, said melting agent being provided in amounts between about 5% and about 50% of the weight of said water.

11. A composition according to claim 10 wherein said melting agent is provided in amounts between about 5% and about 30% of the weight of said water.

12. A composition according to claim 7 wherein said anti-acid limiters are provided in amounts from about 0.05% to about 1.00% of the weight of said melting additive.

13. A composition according to claim 12 wherein said anti-acid limiters are provided in amounts between about 0.15% and about 0.25% of the weight of said melting additive.

14. A composition according to claim 1 wherein said expanded clay has a grain size substantially between about 0.1 mm and about 6.0 mm.

15. A composition according to claim 14 wherein said expanded clay has a grain size substantially between about 0.1 mm and about 2.0 mm.

16. A composition according to claim 15 wherein said grain size of between about 60 wt. % and about 65 wt. % of said expanded clay is larger than about 0.5 mm, and said grain size of between about 30 wt. % and about 35 wt. % of said expanded clay is between about 0.1 mm and about 0.5 mm.

* * * * *

UNITED STATES PATENT AND TRADEMARK OFFICE
CERTIFICATE OF CORRECTION

PATENT NO. : 4,936,915

DATED : June 26, 1990

INVENTOR(S) : Canzani

It is certified that error appears in the above-identified patent and that said Letters Patent is hereby corrected as shown below:

On the title page, "Porous Inert Road Grit" should read --Friction Activating Composition For Icy Surfaces--;

Column 1, line 1, "Porous Inert Road Grit" should read --Friction Activating Composition For Icy Surfaces--;

Column 3, line 60, "melt "melt" should read --melt--;

Column 4, line 2, "surface"" should read --surface--.

Signed and Sealed this

Twenty-seventh Day of August, 1991

Attest:

HARRY F. MANBECK, JR.

Attesting Officer

Commissioner of Patents and Trademarks